United States Patent
Abdolkhani (10) Patent No.: US 10,447,090 B1
(45) Date of Patent: Oct. 15, 2019

(54) INDUCTIVE POWER RECEIVER

(71) Applicant: Apple Inc., Cupertino, CA (US)

(72) Inventor: Ali Abdolkhani, Auckland (NZ)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/815,267

(22) Filed: Nov. 16, 2017

Related U.S. Application Data (60) Provisional application No. 62/423,489, filed on Nov. 17, 2016.

(51) Int. Cl.
| | |
|---|---|
| *H02J 50/12* | (2016.01) |
| *H02J 5/00* | (2016.01) |
| *H02J 7/02* | (2016.01) |
| *H04B 5/00* | (2006.01) |
| *H02M 7/219* | (2006.01) |
| *H02J 50/40* | (2016.01) |
| *H01F 38/14* | (2006.01) |
| *H02M 1/00* | (2006.01) |

(52) U.S. Cl.
CPC .............. *H02J 50/12* (2016.02); *H01F 38/14* (2013.01); *H02J 5/005* (2013.01); *H02J 7/025* (2013.01); *H02J 50/40* (2016.02); *H02M 7/219* (2013.01); *H04B 5/0037* (2013.01); *H02M 2001/0006* (2013.01); *H02M 2001/007* (2013.01)

(58) Field of Classification Search
CPC .. H02J 50/12; H02J 50/40; H02J 5/005; H02J 7/025; H01F 38/14; H02M 7/219; H04B 5/0037
See application file for complete search history.

(56) References Cited

U.S. PATENT DOCUMENTS

| | | | |
|---|---|---|---|
| 4,833,337 A | 5/1989 | Kelley et al. | |
| 4,973,907 A | 11/1990 | Bergman et al. | |
| 6,515,878 B1 | 2/2003 | Meins et al. | |
| 8,093,758 B2 | 1/2012 | Hussmann et al. | |
| 2007/0237273 A1 | 10/2007 | Tan et al. | |
| 2008/0235869 A1 | 10/2008 | Matsuo | |
| 2010/0171368 A1 | 7/2010 | Schatz et al. | |
| 2011/0053500 A1 | 3/2011 | Menegoli et al. | |

(Continued)

FOREIGN PATENT DOCUMENTS

| | | |
|---|---|---|
| CN | 101023600 A | 8/2007 |
| CN | 101902083 A | 12/2010 |

(Continued)

OTHER PUBLICATIONS

Boonyaroonate et al., "Analysis and Design of Class E Isolated DC/DC Converter Using Class E Low dv/dt PWM Synchronous Recrifier", IEEE Transactions on Power Electronics, Institute of Electrical and Electronics Engineers, USA, vol. 16, No. 4, Jul. 1, 2002 (Jul. 1, 2001), XP011043568, ISSN: 0885-8993.

(Continued)

*Primary Examiner* — Robert L Deberadinis (57) ABSTRACT

An inductive power receiver, comprising: a receiving coil; a bridge circuit configured to connect to the receiving coil comprising: a first branch including a first semiconductor device; a second branch including a second semiconductor device; a third branch including a first capacitor; and a forth branch including a second capacitor, and a controller configured to control at least one of the first semiconductor device and the second semiconductor device to regulate power provided to a load.

10 Claims, 7 Drawing Sheets

(56) References Cited

U.S. PATENT DOCUMENTS

| | | |
|---|---|---|
| 2011/0090723 A1 | 4/2011 | Hu et al. |
| 2011/0105023 A1 | 5/2011 | Scheer et al. |
| 2011/0254377 A1 | 10/2011 | Wildmer et al. |
| 2012/0267960 A1 | 10/2012 | Low et al. |
| 2014/0028108 A1 | 1/2014 | Hsu |

FOREIGN PATENT DOCUMENTS

| | | |
|---|---|---|
| CN | 103944388 A | 7/2014 |
| JP | 2000184625 | 6/2000 |
| JP | 2001238372 A | 8/2001 |
| JP | 2005168246 A | 6/2005 |
| JP | 2009201211 | 9/2009 |
| JP | 2009539343 A | 11/2009 |
| JP | 2011205761 | 10/2011 |
| JP | 2012060850 A | 3/2012 |
| JP | 2012130173 A | 7/2012 |
| WO | 2004105208 A1 | 12/2004 |
| WO | 2008039945 A2 | 4/2008 |
| WO | 2009091267 A2 | 7/2009 |
| WO | 2010030195 A1 | 3/2010 |
| WO | 2011145953 | 11/2011 |
| WO | 2013006068 A1 | 1/2013 |
| WO | 2013070094 A2 | 5/2013 |
| WO | 2013080212 A2 | 6/2013 |
| WO | 2014042681 A2 | 3/2014 |

OTHER PUBLICATIONS

Luk et al., "State-Space Modeling of a Class Ed Converter for Inductive Links", IEEE Transactions on Power Electronics. Institute of Electrical and Electronics Engineers, USA, vol. 30, No. 6, Jun. 24, 2014 (Jun. 24, 2014), pp. 3242-3251, XP011570281, ISSN: 0885-8993, DOI: 10.1103/TPEL.2014.2332451 [retrieved on Jan. 16, 2015].

Hirota et al., "Pratical evaluations of single-ended load resonant inverter using application-specific heating appliance", Power Electronics and Drive Systems, 1995., Proceedings of the 1995 Intern Ational Conference on Singapore 21-24 Feb. 1, New Your, NY, USA, IEEE, Feb. 21, 1995 (Feb. 21, 1995), pp. 531-537, XP010140703, DOI: 10.1109/PEDS.1995.404866, ISBN: 987-0-8703-2423-7.

Terai et al, "Comparative performance evaluations of IGBT's and MCT incorporated into voltage-source-type single-ended quasi-resonant zero-voltage soft switching inverter", Electrical Engineering in Japan, vol. 144, No. 3, Aug. 1, 2003 (Aug. 1, 2003), pp. 58-68, XP055504116, US ISSN: 0424-7760, DOI: 10.1002/eej.10151.

Omori et el., A new resonant IPT-wireless EV charging system with single-ended quasi-resonant inverter for home use, 2013 IEEE 14th Workshop on Control and Modeling for Power Electronics (Compel). IEEE, Jun. 23, 2013 (Jun. 23, 2013), pp. 1-7, XP032500858, ISSN: 1093-5142, DOI: 10.1109/COMPEL.2013.6626448 [retrieved on Oct. 9, 2013].

INDUCTIVE POWER RECEIVER

This patent application claims the benefit of provisional patent application No. 62/423,489, filed on Nov. 17, 2016, which is hereby incorporated by reference herein in its entirety.

FIELD

This invention is in the field of inductive power transfer (IPT). More particularly, the invention relates to receivers for use in IPT systems.

BACKGROUND

Electrical converters are found in many different types of electrical systems. Generally speaking, a converter converts a supply of a first type to an output of a second type. Such conversion can include DC-DC, AC-AC and DC-AC electrical conversions. In some configurations a converter may have any number of DC and AC 'parts', for example a DC-DC converter might incorporate an AC-AC converter stage in the form of a transformer.

One example of the use of converters is in inductive power transfer (IPT) systems. IPT systems are a well-known area of established technology (for example, wireless charging of electric toothbrushes) and developing technology (for example, wireless charging of handheld devices on a 'charging mat').

IPT systems will typically include an inductive power transmitter and an inductive power receiver. The inductive power transmitter includes a transmitting coil or coils, which are driven by a suitable transmitting circuit to generate an alternating magnetic field. The alternating magnetic field will induce a current in a receiving coil or coils of the inductive power receiver. The received power may then be used to charge a battery, or power a device or some other load associated with the inductive power receiver. Further, the transmitting coil and/or the receiving coil may be connected to a resonant capacitor to create a resonant circuit. A resonant circuit may increase power throughput and efficiency at the corresponding resonant frequency.

Typically, receivers used in IPT systems consist of a power receiving coil and a circuit topology configured to convert the induced power from AC to DC and to regulate the voltage of the power ultimately provided to a load.

A common problem with receivers used in IPT systems is that switched-mode regulators may include a DC inductor. The DC inductor acts as an energy store so that power can be suitably regulated. Such DC inductors can be a bulky circuit component, significantly affecting the total size occupied by the receiver. This can be a particular problem in applications where it is preferable that the receiver be as small as possible (for example, receivers used with mobile devices).

Another problem with known receivers is that they can include a substantial number of components. For switched-mode regulators this can include multiple switches. This adds to the bulk and complexity, and ultimately cost, of the receiver. As there is a growing desire to adopt IPT systems in consumer devices (such as smartphones), such increased bulk, complexity and cost presents a barrier to wide spread adoption that needs to be minimised.

SUMMARY

According to one exemplary embodiment there is provided an inductive power receiver, comprising: a receiving coil; a bridge circuit configured to connect to the receiving coil comprising: a first branch including a first semiconductor device; a second branch including a second semiconductor device; a third branch including a first capacitor; and a forth branch including a second capacitor, and a controller configured to control at least one of the first semiconductor device and the second semiconductor device to regulate power provided to a load.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1:
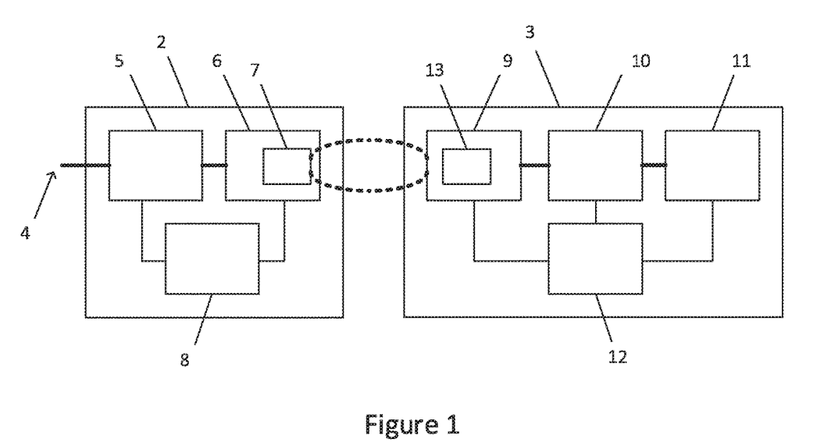
FIG. 1 shows a block diagram of an IPT system.

An inductive power transfer (IPT) system 1 is shown generally in FIG. 1. The IPT system includes an inductive power transmitter 2 and an inductive power receiver 3. The inductive power transmitter 2 is connected to an appropriate power supply 4 (such as mains power or a battery). The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the inductive power transmitter 2. The controller 8 may be adapted to receive inputs from each part of the inductive power transmitter 2 and produce outputs that control the operation of each part. The controller 8 may be implemented as a single unit or separate units, configured to control various aspects of the inductive power transmitter 2 depending on its capabilities, including for example: power flow, tuning, selectively energising transmitting coils, inductive power receiver detection and/or communications.

The inductive power receiver 3 includes a power pick up stage 9 connected to power conditioning circuitry 10 that in turn supplies power to a load 11. The power pick up stage 9 includes inductive power receiving coil or coils 13. When the transmitting coil(s) 7 of the inductive power transmitter 2 and the receiving coil(s) 13 inductive power receiver 3 are suitably coupled, the alternating magnetic field generated by the transmitting coil or coils 7 induces an alternating current in the receiving coil or coils 13. The receiving coil or coils 13 may be connected to capacitors (not shown) either in parallel or series to create a resonant circuit. Some inductive power receivers may include a controller 12 which may control tuning of the receiving coil or coils 13, operation of the power conditioning circuitry 10 and/or communications.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. Other configurations may be used depending on the application. The use of the term "coil", in either singular or plural, is not meant to be restrictive in this sense.

Figure 2:
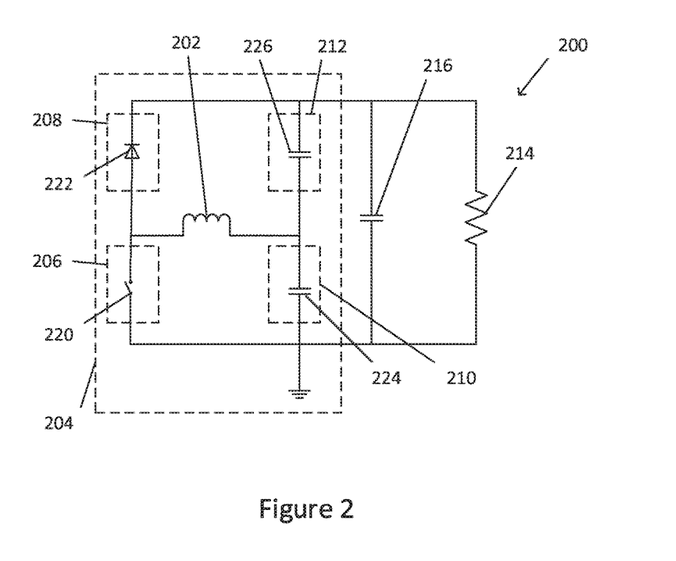
FIG. 2 shows a circuit diagram for a receiver topology according to one embodiment of the present invention.

Referring to FIG. 2, there is shown an inductive power receiver 200 for use in an IPT system according to an example embodiment of the present invention. The receiver includes a receiving coil 202. The receiving coil 202 is connected between the branches of a bridge circuit 204 (which in this embodiment is an H-bridge circuit). The bridge circuit 204 comprises four branches: a first branch 206 and a second branch 208 stemming from one end of the receiving coil 202; and a third branch 210 and a fourth branch 212 stemming from the other end of the receiving coil 202.

The first branch 206 includes a first semiconductor device 220 (which in this embodiment is a semiconductor switch) and the second branch includes a second semiconductor device 222 (which in this embodiment is a diode). The semiconductor switch is a low-side controlled switch. In one embodiment, the semiconductor switch may be a MOSFET switch.

The third branch 110 includes a first capacitor 224 and the fourth branch 212 includes a second capacitor 226. In this embodiment, the first capacitor 224 and second capacitor 226 provide resonance to the receiving coil 202. The values of the receiving coil 202 and the capacitors 224 226 will impact the resonant frequency of the receiver 200. Therefore, the receiving coil 202 and the capacitors 224 226 may be selected so as to resonate at the operating frequency of at the operating frequency of the IPT system.

The bridge circuit 204 is connected to a load 214. The load 214 may be any suitable load, such as the battery charging circuit of a mobile device. The load 214 is connected in parallel to a smoothing capacitor 216. Finally, the receiver 200 includes a controller 218 (represented as a block). As will be described in more detail below, the controller is configured to control at least one of the first semiconductor device 220 and the second semiconductor device 222 to regulate the power provided to the load 214.

Having described an example embodiment of the topology of the present invention, its operation will be described, with reference to FIGS. 3A to 3C. Upon the inductive power receiver 200 being suitably coupled with an inductive power transmitter, an AC voltage will be induced across the receiving coil 202 such that the receiving coil acts as an AC voltage source.

Figure 3A:
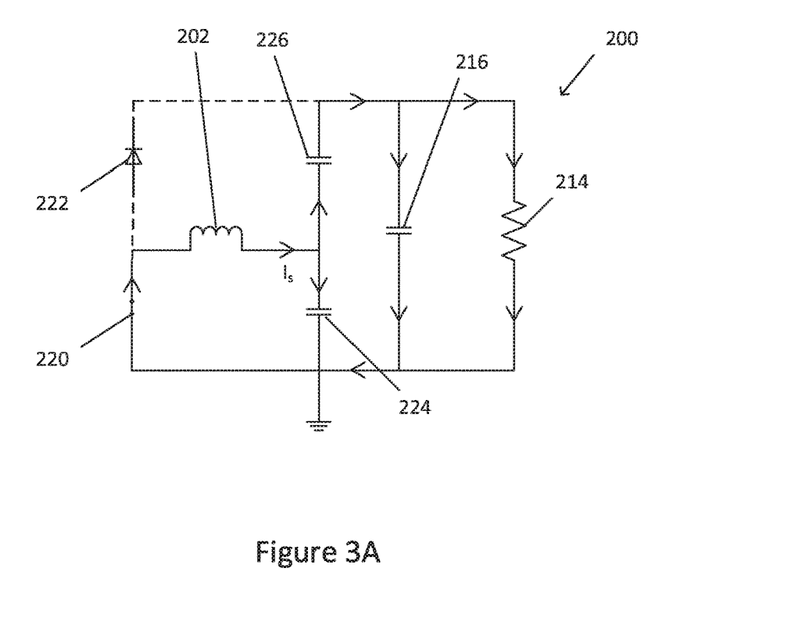
FIGS. 3A to 3C show effective circuit diagrams corresponding to the different stages of operation of the receiver of FIG. 2 according to one embodiment.

A first half cycle is shown in FIG. 3A. During the first half cycle, current $I_s$ flows though the receiving coil 202 from the semiconductor switch 220 to the first and second capacitors 224 226. The semiconductor switch 220 is shown as closed, thereby permitting current flow through the first branch 206. However, it will be appreciated that even if the semiconductor switch 220 were open current would flow as shown in FIG. 3A due to the semiconductor switch's body diode (not shown). Conversely, the orientation of the diode 222 prevents current flow through the second branch 208. Power is supplied to the load 214 (and the smoothing capacitor 216 is charged).

Figure 3B:
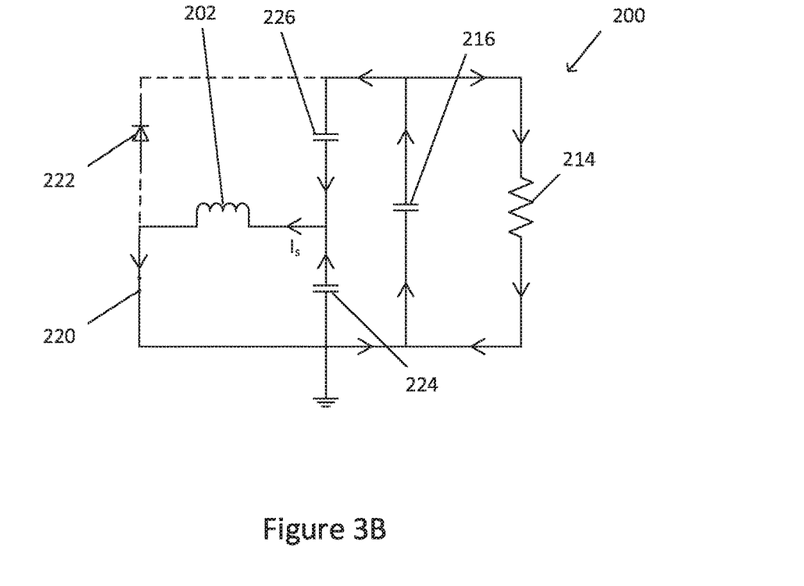
Figure 3C:
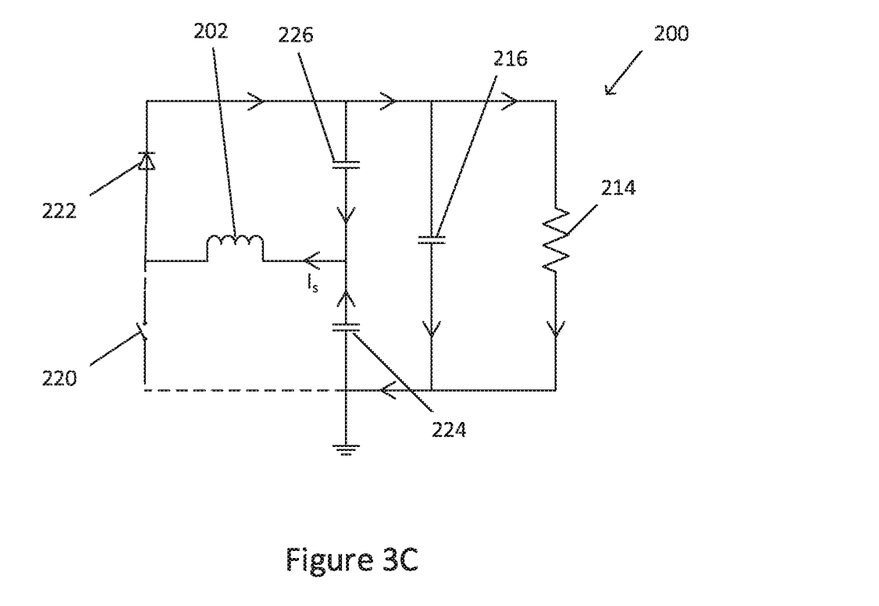

A second half cycle is shown in FIGS. 3B and 3C, in which current $I_s$ flows through the receiving coil 202 in the reverse direction. If the voltage across the load (Wad) is higher than a specified reference voltage ($V_{ref}$), then the semiconductor switch is controlled so that the switch is closed for an interval $t_{2a}$, as shown in FIG. 3B. Since the semiconductor switch 220 is closed, current flows through the first branch 206, and 're-circulated' through the first capacitor 224 and the smoothing capacitor 216. As a result, power from the receiving coil 202 is effectively not supplied to the load 216.

Once interval $t_{2a}$ has elapsed, the semiconductor switch is controlled so that the switch is open, as shown in FIG. 3C. Since the semiconductor switch 220 is open, current flow though the first branch 206 is prevented. As a result current flows through the second branch 208 (the orientation of the diode 222 being such that current flow is now permitted) and power is supplied to the load 214.

Thus, by controlling whether semiconductor switch 220 is open or closed during the second half cycle, it is possible to control whether power is supplied to the load (FIG. 3C) or not (FIG. 3B), thereby regulating the power provided to the load. It will also be appreciated that the output provided to the load 214 is DC. Therefore, the proposed topology achieves both regulation and rectification with one stage. This eliminates that need for distinct rectification and regulation stages, thereby minimising component count and cost.

Another feature shown by FIGS. 3A to 3C, is that for the first cycle and the first part of the second cycle (FIGS. 3A and 3B) the first capacitor 224 is in parallel with the receiving coil 202 and the second capacitor 226 and the smoothing capacitor 216 are in parallel with the receiving coil 202. Provided the smoothing capacitor 216 is relatively large compared to the first capacitor 224 and the second capacitor 226, then analysis of the parallel capacitance shows that the resulting capacitance is simply the sum of the capacitances of the first capacitor 224 and the second capacitor 226. By the same analysis as above, for the second part of the second cycle (FIG. 3C) the resulting capacitance is simply the sum of the capacitance of the first capacitor 224 and the second capacitor 226. Therefore, the resonance of the receiver 200 for the full cycle is determined by the first capacitor 224 and the second capacitor 226 (and the receiving coil 202). As such, the proposed topology shown in this embodiment does not need a separate resonant capacitor to satisfy the requirement for resonance, further minimising component count and cost.

Figure 4:
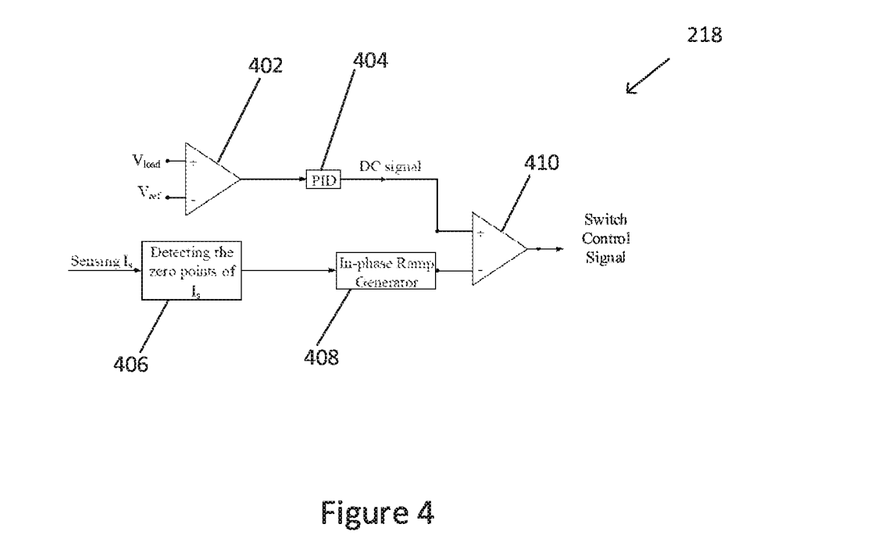
FIG. 4 shows a block diagram of a controller according to one embodiment of the present invention.

FIG. 4 shows an example embodiment of a controller 218, suitable for controlling the semiconductor switch 220 in the receiver 200 described in relation to FIGS. 2 to 3C above. The controller 218 includes a comparator 402, which compares Wad with $V_{ref}$. The output of the comparator is connected to a PID controller 404, which generates a DC signal proportional to the difference between $V_{load}$ and $V_{ref}$. The controller also includes a phase detection module 406 for detecting the phase of the receiving coil current $I_s$ (for example by detecting the zero points of $I_s$). It will be appreciated that other parameters of the circuit may be used to determine phase, for example, voltage. The output of the phase detection module 406 is supplied to an in-phase ramp generator 408, which generates a ramp signal in phase with the receiving coil current $I_s$. The DC signal is compared to the output of the ramp signal by a further comparator 410, generating a switch control signal. The switch control signal is then supplied to the semiconductor switch 220, thereby controlling the switch to achieve the regulation described in relation to FIGS. 3B and 3C.

Figure 5:
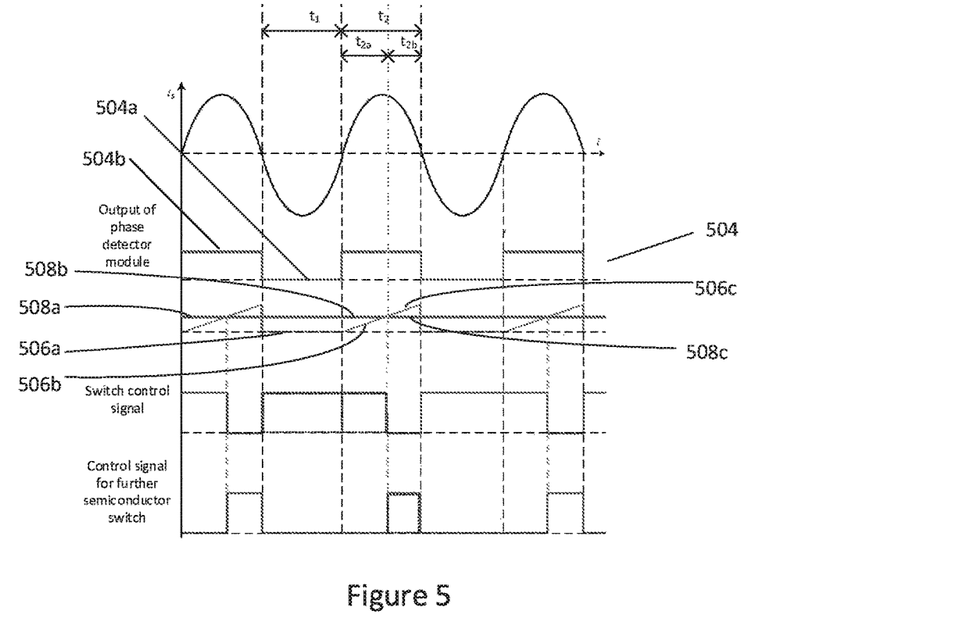
FIG. 5 shows a timing diagram corresponding to a control strategy according to one embodiment of the present invention.

FIG. 5 illustrates a timing diagram corresponding to the control strategy described in relation to FIGS. 3A to 3C and the controller 218 described in FIG. 4. The timing diagram shows the AC receiving coil current $I_s$ and the resulting output of the phase detection module 504. During the first half cycle $t_1$, since the receiving coil current $I_s$ is negative, the output of the phase detection module 504a is zero, and therefore the ramp signal 506a is also zero. In FIG. 5, during the first half cycle $t_1$, the DC signal 508a is a non-zero value. Since the DC signal 508a is greater than the ramp signal 506a, the switch control signal is ON, therefore the semiconductor switch 220 is closed, as is shown in FIG. 3A.

During the second half cycle $t_2$, since the receiving coil $I_s$ is positive, the output of the phase detection module 504b is non-zero, and therefore the ramp signal 506b begins to ramp upwards. During the first part of the second half cycle tea, since the DC signal 508b is greater than the ramp signal 506b, the switch control signal is ON. Therefore, the semiconductor switch 220 is closed resulting in current recirculation, as described in relation to FIG. 3B. However, once the ramp signal 506c is greater than the DC signal 508c (i.e. during the second part of the second half cycle $t_2$b), the switch control signal is OFF. Therefore, the semiconductor switch 220 is opened, resulting in current being provided to the load, as described in relation to FIG. 3C.

It will be appreciated from FIG. 5 that the amount of energy recirculation is related to the proportion of the second half cycle $t_2$ of which the semiconductor switch 220 is closed (i.e. interval $t_{2a}$). The duration of interval $t_{2a}$ (and therefore the amount of energy recirculation) is dependent on the relative magnitude of the DC signal compared to the amplitude of the ramp signal. Thus, if the DC signal is relatively small compared to the amplitude of the ramp signal, then this would result in a relatively short interval $t_{2a}$ and a smaller amount of energy recirculation. Conversely, if the DC signal is similar to or larger than the amplitude of the ramp signal (indicating that $V_{out}$ is higher than $V_{ref}$), then this would result in a relatively long interval $t_{2a}$. This would give a larger amount of energy recirculation, as is needed since $V_{out}$ is higher than $V_{ref}$. The controller 218 can therefore be calibrated so as to achieve the desired amount of energy recirculation for the particular receiver 200. The controller 218 may be calibrated by adjusting the relative amplitudes of the DC signal and the ramp signal. In one embodiment, the controller 218 may be configured such that for full load conditions, interval $t_{2a}$ is essentially zero (i.e. the semiconductor switch 220 would operate at 50% duty cycle), and under no load conditions, interval $t_{2a}$ equals $t_1$ (i.e. the semiconductor switch 220 would operate at 100% duty cycle).

It will also be appreciated from FIG. 5, that the semiconductor switch 220 is closed (i.e. that switch signal is ON) when the current through the semiconductor switch 220 is zero. This results in zero-current switching and minimised losses.

In another embodiment of the receiver 200 described in relation to FIGS. 2 to 5, the diode 222 may be replaced by a further semiconductor switch. The further semiconductor switch would need to be controlled such that it is closed during interval $t_{2b}$ (permitting current flow through the second branch 208, as shown in FIG. 3C) and open at all other times (preventing current flow through the second branch, as shown in FIG. 3A). Such operation could be achieved using a signal that is the negation of the switch control signal. Such a signal is also shown on FIG. 5.

Figure 6A:
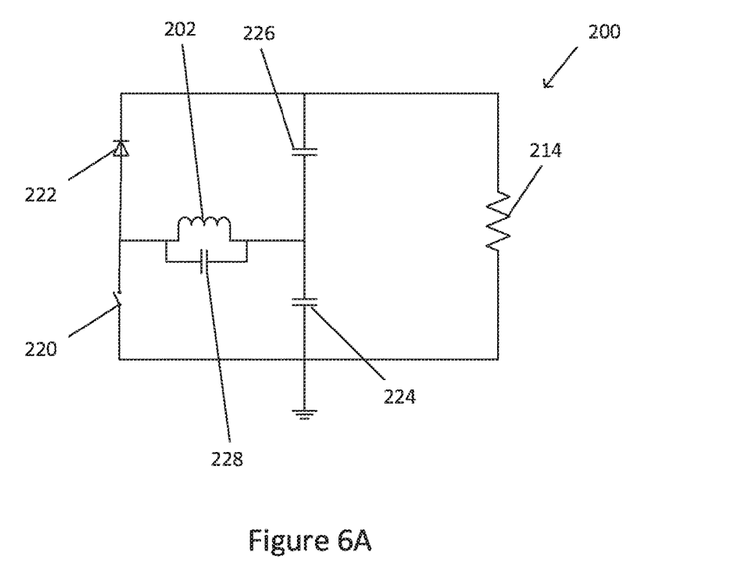
FIGS. 6A to 6B show circuit diagrams for receiver topologies according to further embodiments of the present invention.
Figure 6B:
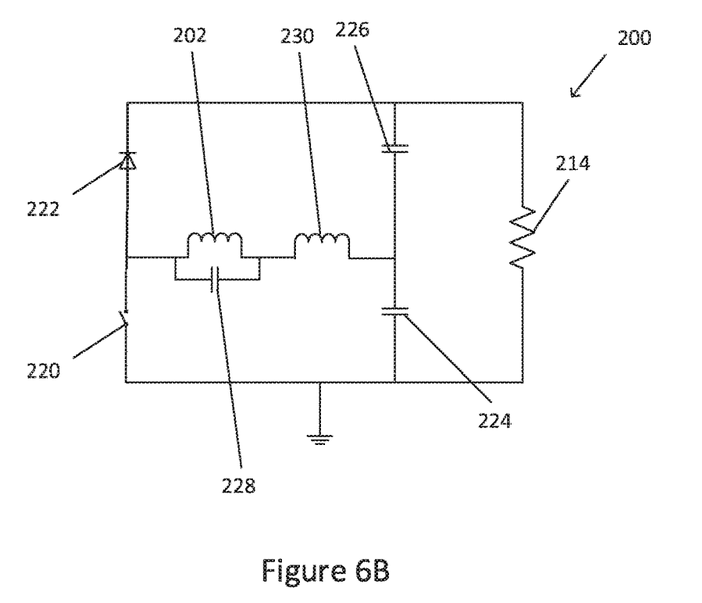

In another variation of the inductive power receiver 200 shown in FIG. 2, the receiving coil 202 may be connected with a dedicated resonant capacitor. FIG. 6A shows an embodiment in which the receiving coil 202 is connected in parallel with a resonant capacitor 228. A benefit of this embodiment is that the smoothing capacitor is eliminated, with the first capacitor 224 and second capacitor 226 acting as smoothing capacitors. FIG. 6B shows another embodiment in which the receiving coil is connected as part of an LCL topology including a resonant capacitor 228 and a further inductor 230. Again, the first capacitor 224 and second capacitor 226 act as smoothing capacitors, eliminating the need for a separate smoothing capacitor.

In a further variation of the inductive power receiver 200 shown in FIG. 2, the first branch 206 may include a further semiconductor switch connected in series with the semiconductor switch 220. The further semiconductor switch may be orientated such that its body diode is opposite to the body diode of the semiconductor switch 220. The combination of switches in the first branch 206 can then be controlled using an open circuit control strategy during the first part of the cycle.

Figure 7:
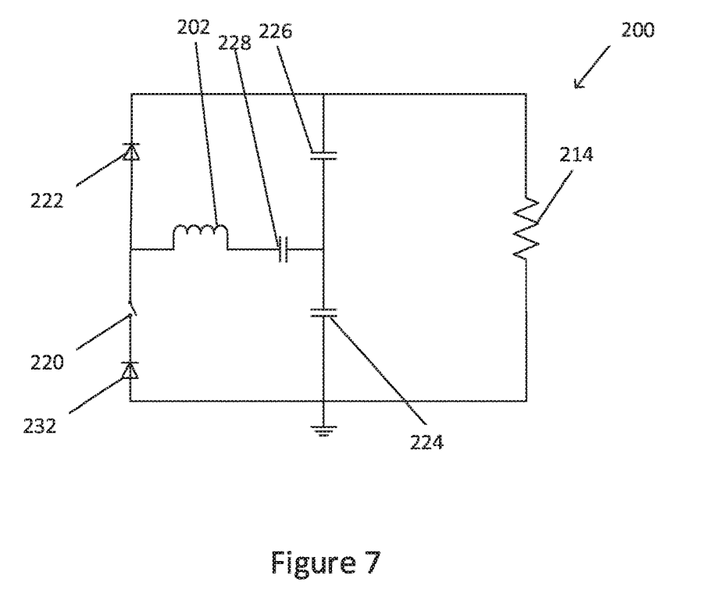
FIG. 7 shows a circuit diagram for a receiver topology according to one embodiment of the present invention.

FIG. 7 shows another embodiment of the receiver 200 in which the receiving coil 202 is connected in series with a resonant capacitor 228. The first branch 206 includes a further diode 232 connected in series with the first semiconductor switch 220. It should be noted that the polarity of the first semiconductor switch 220 has been reversed (as compared to the embodiment described in relation to FIG. 2). It will be appreciated that the further diode 232 prevents current flow in the reverse direction through the first branch 206, thereby effecting the operation of the circuit, as will be described with reference to FIGS. 8A to 8C.

Figure 8A:
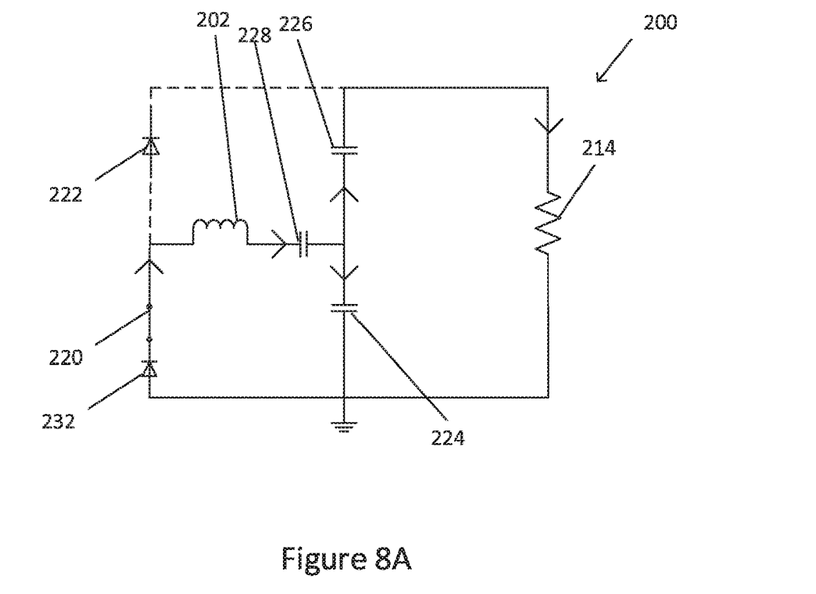
FIGS. 8A to 8C show effective circuit diagrams corresponding to the different stages of operation of the receiver of FIG. 7 according to one embodiment.
Figure 8B:
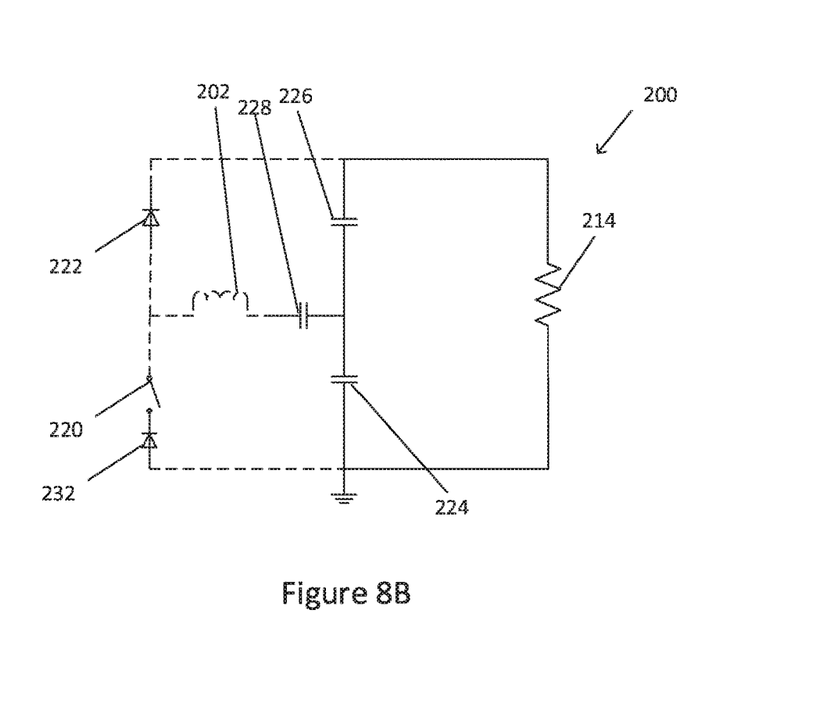

A first half cycle is shown in FIGS. 8A and 8B. During the first half cycle, current $I_s$ flows though the receiving coil 202 from the semiconductor switch 220 to the second capacitor 226. The semiconductor switch 220 is controlled so that the switch is closed for an interval $t_{1a}$, as shown in FIG. 8A. Since the semiconductor switch 220 is closed, current is permitted to flow through the first branch 206. The orientation of the diode 222 prevents current flow through the second branch 208. Power is supplied to the load 214.

If the voltage across the load ($V_{load}$) is higher than a specified reference voltage ($V_{ref}$), then the semiconductor switch 220 is controlled so that the switch is open for an interval $t_{1b}$, as shown in FIG. 8B. This prevents current flow through the first branch and the receiving coil 202, and no power is supplied to the load. It will be appreciated that the orientation of the semiconductor switch 220 is such that switch's body diode (not shown) also prevents current flow.

Figure 8C:
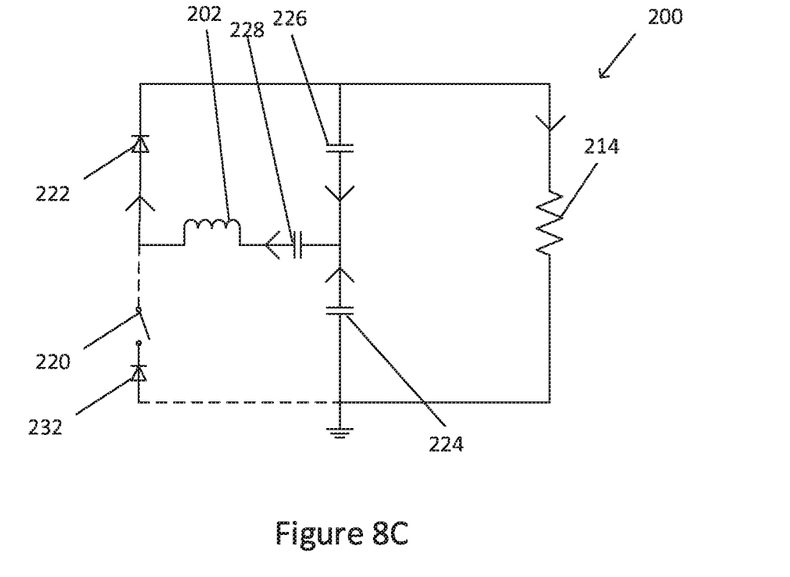

A second half cycle is shown in FIG. 8C, in which current $I_s$ flows through the receiving coil 202 in the reverse direction. Current flows through the second branch 208 and power is provided to the load 214. The semiconductor switch 220 is shown as open. However, it will be appreciated that even if the semiconductor switch 220 were closed current would not flow on account of the further diode 232.

Thus, by controlling whether semiconductor switch 220 is open or closed during the first half cycle, it is possible to control whether power is supplied to the load (FIG. 8A) or not (FIG. 8B), thereby regulating the power provided to the load. Those skilled in the art how the controller of FIG. 4 may be adapted to implement the power control strategy described in relation to FIGS. 8A to 8C.

In yet a further variation of the inductive power receiver 200 shown in FIG. 2, the third branch 210 may include a further semiconductor switch connected in parallel with the first capacitor 224. The further semiconductor switch can then be controlled so as to achieve closed circuit control during the first part of the cycle by selectively shorting the receiving coil 202.

Figure 9:
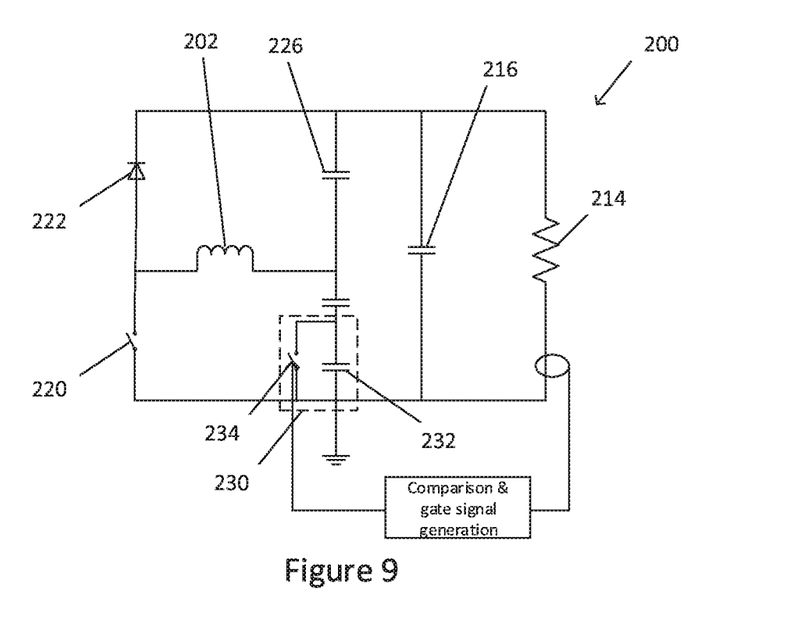
FIG. 9 shows a circuit diagram for a receiver topology according to a further embodiment of the present invention.

FIG. 9 shows a further variation of the receiver 200 shown in FIG. 2. In some embodiments, it may be desirable to have less current flowing through the receiving coil 202 (for example, under light load conditions when the power demand is low). To decrease the current, the receiver 200 may include a detuning network 230. The detuning network 230 is configured to allow the receiving coil 202 to be selectively detuned, thereby decreasing the amount of power received by the receiving coil 202 and the current provided to the load 214. For example, the detuning network may comprise a detuning component (e.g. a capacitor or an inductor) connected in parallel with a detuning switch. Such a detuning network may be positioned in series with other components in the receiver 200 (for example, the first capacitor 224 in the third branch 210 or the receiving coil 202 itself). In the embodiment shown in FIG. 6, the detuning network comprises a detuning capacitor 232 connected in parallel with a detuning switch 234. The detuning network 230 is part of the third branch and connected in series with the first capacitor 224. Under normal operations, the detuning switch is closed. However, when the detuning switch is closed, the detuning component is introduced into the resonant circuit and the receiving coil 202 is detuned, reducing the current through the load. The switch may be controlled by a controller, configured to detect the current through the load 214, and open or close the detuning switch accordingly. For example, if the load current falls below a particular threshold, the detuning switch may be opened to detune the receiving coil and decrease the current provided to the load. One particular advantage of a detuning network is that upon startup of the receiver 200, the receiving coil 202 can be initially detuned, limiting the current supplied to the load, which eliminates the possibility of voltage overshoots. Once the power demand exceeds a certain threshold, the receiving coil may then be tuned so that the power demand can be met.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power receiver, comprising:
    a. a receiving coil;
    b. a bridge circuit adapted to couple to the receiving coil, the bridge circuit comprising:
        i. a first branch including a first semiconductor device;
        ii. a second branch including a second semiconductor device;
        iii. a third branch including a first capacitor; and
        iv. a fourth branch including a second capacitor, and
    c. a controller adapted to control at least one of the first semiconductor device and the second semiconductor device to regulate power provided to a load.

2. The inductive power receiver as claimed in claim 1, wherein the first semiconductor device is a first semiconductor switch.

3. The inductive power receiver as claimed in claim 2, wherein the second semiconductor device is a diode.

4. The inductive power receiver as claimed in claim 2, wherein the second semiconductor device is a second semiconductor switch.

5. The inductive power receiver as claimed in claim 1, wherein the receiver includes a smoothing capacitor coupled in parallel across the load.

6. The inductive power receiver as claimed in claim 1, wherein the bridge circuit is an H-bridge circuit.

7. The inductive power receiver as claimed claim 1, wherein the receiving coil is coupled to a resonant capacitor.

8. The inductive power receiver as claimed in claim 7, wherein the resonant capacitor is coupled in series with the receiving coil.

9. The inductive power receiver as claimed in claim 1, wherein the first semiconductor device is a first semiconductor switch and wherein the first branch includes a further semiconductor switch coupled in series with the first semiconductor switch.

10. The inductive power receiver as claimed in claim 1, wherein the receiver includes a detuning network, comprising a detuning component and a detuning switch, the detuning switch adapted to detune the receiving coil.

* * * * *